(12) United States Patent
Hsu

(10) Patent No.: US 9,596,951 B2
(45) Date of Patent: Mar. 21, 2017

(54) VIBRATION AND NOISE ABSORBING MAT STRUCTURE

(71) Applicant: XIGMA STYLE CORP., New Taipei (TW)

(72) Inventor: Fu-Yi Hsu, Taitung County (TW)

(73) Assignee: XIGMA STYLE CORP., New Taipei (TW)

( * ) Notice: Subject to any disclaimer, the term of this patent is extended or adjusted under 35 U.S.C. 154(b) by 0 days.

(21) Appl. No.: 14/988,791

(22) Filed: Jan. 6, 2016

(65) Prior Publication Data

US 2016/0227951 A1 Aug. 11, 2016

(30) Foreign Application Priority Data

Feb. 6, 2015 (TW) .............................. 104201983 U

(51) Int. Cl.
| A47G 27/02 | (2006.01) |
| E04F 15/20 | (2006.01) |
| G10K 11/168 | (2006.01) |
| F16F 3/087 | (2006.01) |
| G10K 11/16 | (2006.01) |

(52) U.S. Cl.
CPC .......... *A47G 27/0212* (2013.01); *F16F 3/087* (2013.01); *G10K 11/16* (2013.01); *G10K 11/168* (2013.01)

(58) Field of Classification Search
CPC ......... E04F 15/20; E04F 15/206; F16F 3/087; G10K 11/16; G10K 11/168; A47G 27/0212; A47G 27/0206; A47G 27/0293; B32B 2250/22; A47C 27/148; A47C 27/15

USPC ............................ 181/208, 290; 5/420, 655.9
See application file for complete search history.

(56) References Cited

U.S. PATENT DOCUMENTS

| 3,434,715 A * | 3/1969 | Brantingham ..... A47G 27/0231 482/79 |
| 3,667,142 A * | 6/1972 | Goodloe .................. D06F 83/00 38/66 |
| 5,157,804 A * | 10/1992 | Williams ................ A47L 23/26 15/161 |
| 5,327,596 A * | 7/1994 | Wallace .................. A47C 27/20 5/655.7 |
| 7,182,994 B1 * | 2/2007 | Scott ........................ B32B 3/30 180/290 |
| 7,661,166 B1 * | 2/2010 | Marling ................ A47C 27/001 5/691 |
| 8,066,097 B2 * | 11/2011 | Boyadjian ............... E04F 13/08 181/285 |

(Continued)

*Primary Examiner* — Jeremy Luks
(74) *Attorney, Agent, or Firm* — Li & Cai Intellectual Property (USA) Office

(57) ABSTRACT

The invention provides a vibration and noise absorbing mat structure which includes a flexible mat body including a sound-absorbing layer, a vibration damping layer and a buffer layer stacked in order. The sound-absorbing layer is made of a first foam body having a relatively low hardness. The vibration damping layer includes a sub-layer which is composed of a second foam body having a relatively high hardness, a third foam body having a relatively high elasticity and a fourth foam body having a relatively high hardness stacked in order. The buffer layer is composed of a fifth foam body and a plurality of buffer units spacedly disposed on a bottom side of the fifth foam body.

15 Claims, 6 Drawing Sheets

(56) References Cited

U.S. PATENT DOCUMENTS

| | | | |
|---|---|---|---|
| 8,668,045 B2* | 3/2014 | Cohen | A61H 23/0236 181/150 |
| 2002/0025751 A1* | 2/2002 | Chen | B32B 5/18 442/324 |
| 2004/0048036 A1* | 3/2004 | Nakasuji | B32B 5/26 428/95 |
| 2004/0062904 A1* | 4/2004 | Rice | B29C 44/146 428/95 |
| 2004/0131836 A1* | 7/2004 | Thompson | B01D 53/228 428/304.4 |
| 2006/0036201 A1* | 2/2006 | Cohen | A61H 23/0236 601/47 |
| 2009/0191382 A1* | 7/2009 | Usuda | A47L 23/266 428/172 |
| 2011/0024229 A1* | 2/2011 | Yang | B60N 3/048 181/294 |
| 2013/0156990 A1* | 6/2013 | Chen | B60N 3/04 428/71 |
| 2013/0327589 A1* | 12/2013 | Smith | G10K 11/002 181/290 |
| 2014/0097037 A1* | 4/2014 | Wingfield | E04B 1/84 181/290 |
| 2015/0068838 A1* | 3/2015 | Keene | E04F 15/20 181/292 |
| 2015/0296995 A1* | 10/2015 | Krim | A47C 27/15 5/724 |

* cited by examiner

VIBRATION AND NOISE ABSORBING MAT STRUCTURE

BACKGROUND

1. Technical Field

The present disclosure relates to a mat structure, in particular, to a mat structure with the ability to absorb noise and vibration.

2. Description of Related Art

Nowadays, the mat, such as the foot mat operable for use in a TV game, or the household mat for protecting children from harm, is either too soft or too hard, so that the mat may sag heavily in the middle or generate a large noise when struck by the soles of a user's feet.

To address the above issues, the inventor strives via associated experience and research to present the instant disclosure, which can effectively improve the limitation described above.

SUMMARY

The object of the instant disclosure is to provide a vibration and noise absorbing mat structure with a sound absorbing, vibration damping and buffering function.

In order to achieve the aforementioned objectives, according to an embodiment of the instant disclosure, a vibration and noise absorbing mat structure is provided. The vibration and noise absorbing mat structure includes a flexible mat body including a sound-absorbing layer, a vibration damping layer and a buffer layer stacked in order. The sound-absorbing layer is made of a first foam body having a relatively low hardness. The vibration damping layer includes a sub-layer which is composed of a second foam body having a relatively high hardness, a third foam body having a relatively high elasticity and a fourth foam body having a relatively high hardness stacked in order. The buffer layer is composed of a fifth foam body and a plurality of buffer units spacedly disposed on a bottom side of the fifth foam body.

Therefore, the instant disclosure has at least the following advantages: the vibration and noise absorbing mat structure can provide a sound absorbing, vibration damping and buffering effect through the sound-absorbing layer, the vibration damping layer and the buffer layer arranged in a stacked arrangement. The sound-absorbing layer can reduce the noise generated by a foot striking against the outer surface of the mat body, through the use of a soft foam material. The vibration damping layer is capable of simulating a floorboard in its hardness by avoiding a too soft tread feeling and can simultaneously reduce vibration and noise by means of the sandwich arrangement. In addition, the buffer layer is composed of a foam body of high hardness and the buffer units are disposed on the bottom side thereof, so that the foam body of high hardness can downwardly compress and temporarily deform the buffer units under the influence of an above impacting force, in order to mitigate the impact force and reduce the impact sound. In this way, the buffer and acoustic insulation capacity of the entire mat body can be improved considerably.

These and other objectives and advantages of this invention may be clearly understood from the detailed description by referring to the following drawings.

DESCRIPTION OF THE EXEMPLARY EMBODIMENTS

The aforementioned illustrations and following detailed descriptions are exemplary for the purpose of further explaining the scope of the present invention. Other objectives and advantages related to the present invention will be illustrated in the subsequent descriptions and appended drawings.

[First Exemplary Embodiment]

Figure 1:
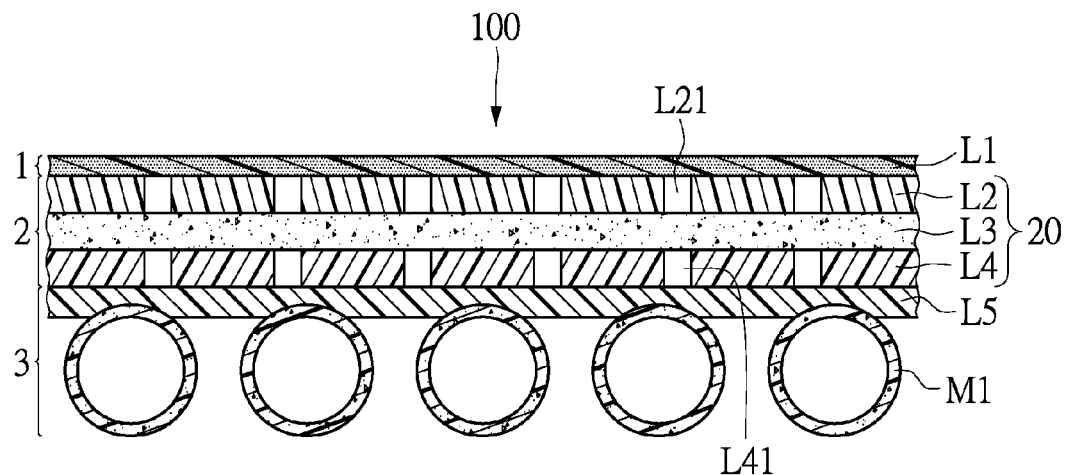
FIG. 1 shows a schematic sectional view of a vibration and noise absorbing mat structure in accordance to a first exemplary embodiment of the present disclosure.

Please refer to FIG. 1, which shows a schematic sectional view of a vibration and noise absorbing mat structure in accordance to a first exemplary embodiment of the present disclosure.

The vibration and noise absorbing mat comprises a mat body 100, which is a flexible multi-layered composite structure. Specifically, the mat body 100 comprises a sound-absorbing layer 1, a vibration damping layer 2 and a buffer layer 3 stacked in sequence from top to bottom. The sound-absorbing layer 1, the vibration damping layer 2 and the buffer layer 3 are arranged one above the other. A method of bonding the abovementioned layers to each other may be, but is not limit to, in the manner of attaching, adhesive bonding or hot-press-bonding.

The sound-absorbing layer 1 (first sound-absorbing layer) is made of a first foam body L1. In the exemplary embodiment, the first foam body L1 has a relatively low hardness. That is, the first foam body L1 can be a soft foam body using a soft foam material, in order to reduce the noise generated when soles of a user's feet hit the outer surface of the mat body 100.

The vibration damping layer 2 comprises a sub-layer 20 (first sub-layer layer). The sub-layer 20 is composed of a second foam body L2 having a relatively high hardness, a third foam body L3 having a relatively high elasticity and a fourth foam body L4 having a relatively high hardness stacked in sequence from top to bottom. Specifically, the second foam body L2 and the fourth foam body L4 are each an EVA (ethylene vinyl acetate copolymer) foam body containing generally 10% to 20% by weight of vinyl acetate, in order to make the second foam body L2 and the fourth foam body L4 harder. In the exemplary embodiment, the second foam body L2 and the fourth foam body L4 each has the hardness in a range of 60-90 Shore A Durometer hardness, so that the second foam body L2 and the fourth foam body L4 are each an EVA foam body of high hardness. In addition, the third foam body L3 may be an EVA foam body, containing more than 30% by weight of vinyl acetate, resulting in the third foam body L3 being more elastic, so that the third foam body L3 in the exemplary embodiment is a highly elastic EVA foam body. Otherwise, the third foam body L3 can be made of memory foam or latex foam.

Since the third foam body L3 is a highly elastic EVA foam body between the second foam body L2 and fourth foam body L4, and the second foam body L2 and fourth foam body L4 each has a greater hardness than that of the third foam body L3, the second, third and fourth foam bodies L2, L3, L4 can be stacked to form a sandwich arrangement. With this arrangement, the second foam body L2 is capable of simulating a floorboard in its hardness, the third foam body L3 can dampen vibration due to its elasticity, and the fourth foam body L4 is for absorbing noise and vibration. Thereby, the mat body 100 can provide a better vibration damping effect and a better sound absorbing effect.

In addition, a plurality of through holes L21 and L41 can be respectively formed in the second foam body L2 and the fourth foam body L4, through which the air permeability can be increased.

The buffer layer 3 is composed of a fifth foam body L5 and a plurality of buffer units M1 spacedly disposed along a bottom side of the fifth foam body L5. In the present embodiment, the fifth foam body L5 is an EVA foam body of high hardness, and each of the buffer units M1 is a convex structure with a thickness of about 10-20 mm. Moreover, each of the buffer units M1 is a closed structure whose interior is already filled with air, so that no additional air is required. Specifically, each of the buffer units M1 is an airbag for buffering a load. Each of the buffer units M1 is given a spherical shape, and the buffer units M1 cooperatively form a curved bottom surface or a convex-concave bottom surface of the mat body 100. With this arrangement of the fifth foam body L5 and the buffer units M1, the fifth foam body L5 can downwardly compress and temporarily deform the buffer units M1 under the influence of an above impacting force, in order to mitigate the impact force and reduce the impact sound. In this way, the buffer and acoustic insulation capacity of the entire mat body 100 can be improved considerably.

[Second Exemplary Embodiment]

Figure 2:
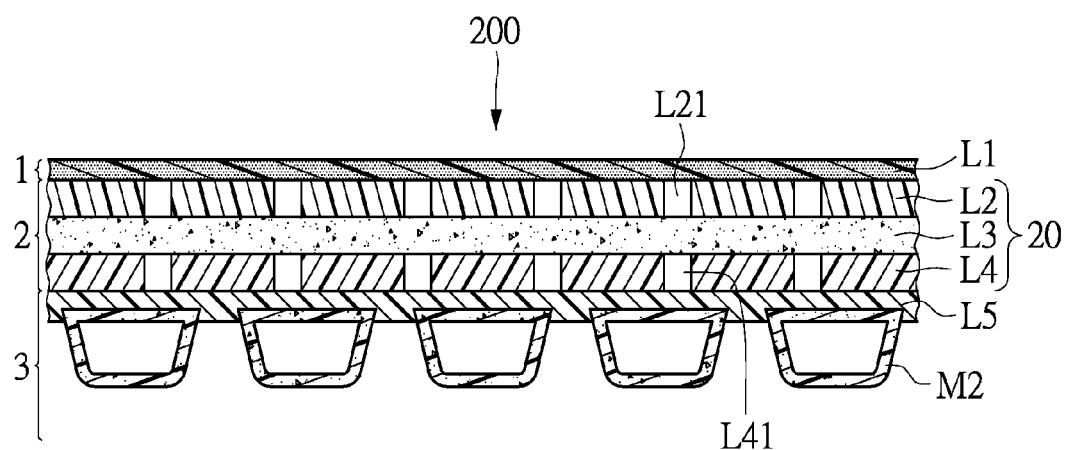
FIG. 2 shows a schematic sectional view of a vibration and noise absorbing mat structure in accordance to a second exemplary embodiment of the present disclosure.

Please refer to FIG. 2, which shows a schematic sectional view of a vibration and noise absorbing mat structure in accordance to a second exemplary embodiment of the present disclosure.

The vibration and noise absorbing mat structure comprises a mat body 200, which is a flexible multi-layered composite structure. The present exemplary embodiment is similar to that of the first exemplary embodiment described above. The main difference between the present exemplary embodiment and the first exemplary embodiment is that each of the buffer units M2 is substantially a trapezoid cylinder structure.

It should be noted that the shape of each buffer unit shown in FIGS. 1 to 8 is not limited. Rather, each buffer unit may be of a variety of sizes and shapes such as polygonal, elliptical, free-form, or other.

[Third Exemplary Embodiment]

Figure 3:
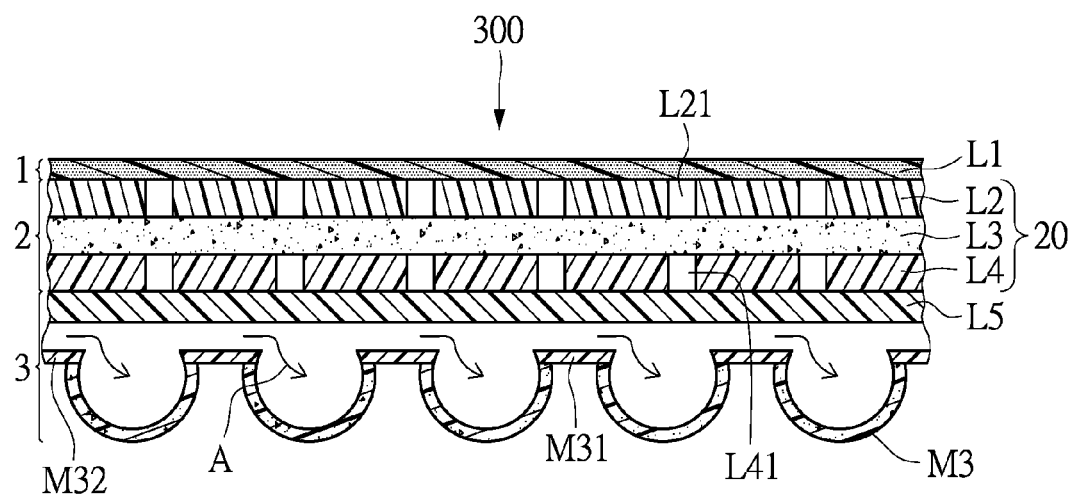
FIG. 3 shows a schematic sectional view of a vibration and noise absorbing mat structure in accordance to a third exemplary embodiment of the present disclosure.

Please refer to FIG. 3, which shows a schematic sectional view of a vibration and noise absorbing mat structure in accordance to a third exemplary embodiment of the present disclosure.

The vibration and noise absorbing mat structure comprises a mat body 300, which is a flexible multi-layered composite structure. The present exemplary embodiment is similar to that of the first exemplary embodiment described above. The main difference between the present exemplary embodiment and the first exemplary embodiment is that the buffer units M3 are communicated with each other via a channel M31. In addition to this, the buffer units M3 are communicated with an air inlet channel M32, through which a predetermined air pressure can be maintained within the buffer units M3 by filling air A in through the air inlet channel M32.

[Fourth Exemplary Embodiment]

Figure 4:
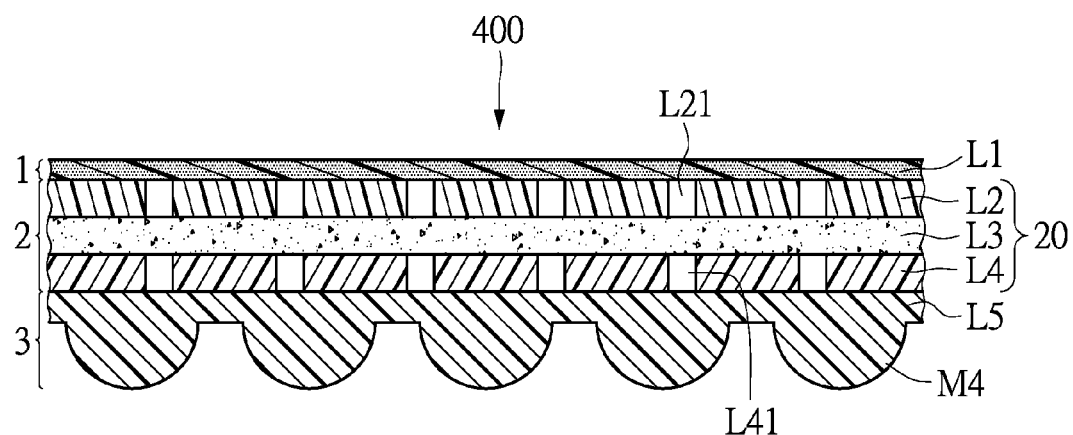
FIG. 4 shows a schematic sectional view of a vibration and noise absorbing mat structure in accordance to a fourth exemplary embodiment of the present disclosure.

Please refer to FIG. 4, which shows a schematic sectional view of a vibration and noise absorbing mat structure in accordance to a fourth exemplary embodiment of the present disclosure.

The vibration and noise absorbing mat structure comprises a mat body 400, which is a flexible multi-layered composite structure. The present exemplary embodiment is similar to that of the first exemplary embodiment described above. The main difference between the present exemplary embodiment and the first exemplary embodiment is that the fifth foam body L5 and the buffer units M4 are formed by hot pressing an EVA foam material with a thickness of 30 mm Thus, the buffer units M4 are integrally formed on the bottom side of the fifth foam body L5, to produce a unitary structure.

[Fifth Exemplary Embodiment]

Figure 5:
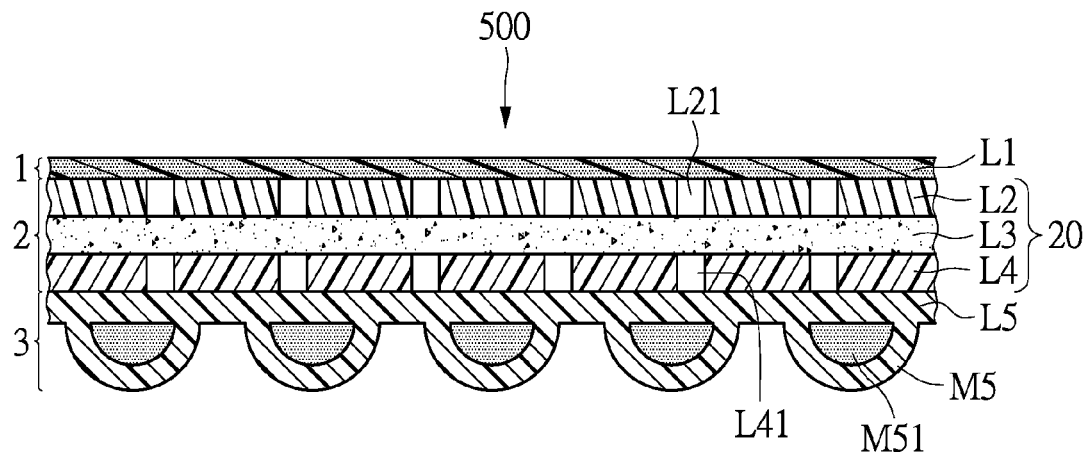
FIG. 5 shows a schematic sectional view of a vibration and noise absorbing mat structure in accordance to a fifth exemplary embodiment of the present disclosure.

Please refer to FIG. 5, which shows a schematic sectional view of a vibration and noise absorbing mat structure in accordance to a fifth exemplary embodiment of the present disclosure.

The vibration and noise absorbing mat structure comprises a mat body 500, which is a flexible multi-layered composite structure. The present exemplary embodiment is similar to that of the first exemplary embodiment described above. The main difference between the present exemplary embodiment and the first exemplary embodiment is that each of the buffer units M5 is substantially a semi-spherical structure. In addition to this, each of the buffer units M5 can be made of thermoplastic polyurethanes (TPU) or from rubber and adhered to the bottom side of the fifth foam body L5 by hot pressing. Furthermore, each of the buffer units M5 can be filled with a selected gas or a filler material. In the present exemplary embodiment, each of the buffer units M5 is filled with a filler material M51 such as sponge or silicone.

[Sixth Exemplary Embodiment]

Figure 6:
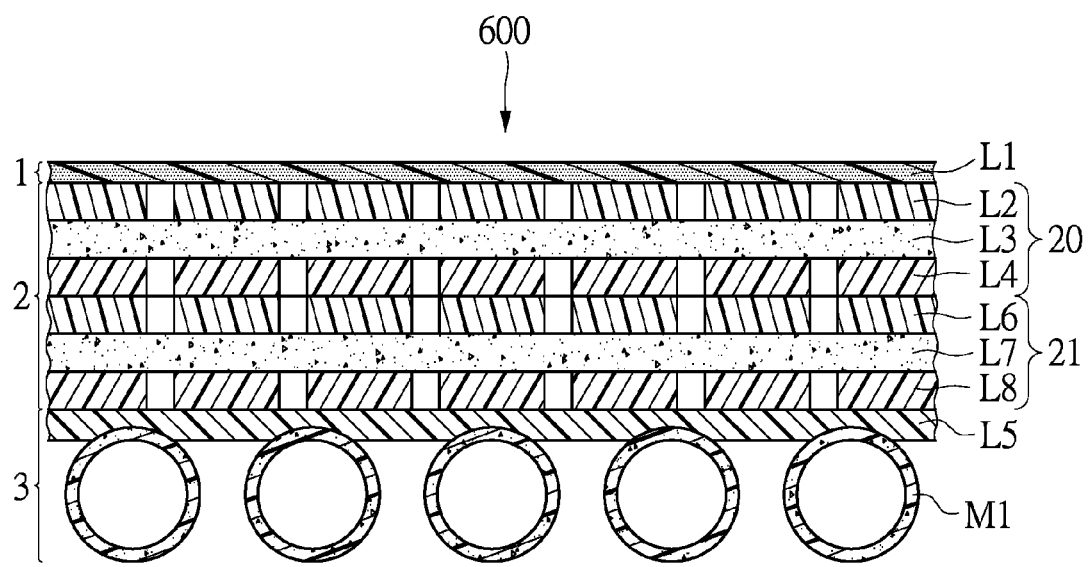
FIG. 6 shows a schematic sectional view of a vibration and noise absorbing mat structure in accordance to a sixth exemplary embodiment of the present disclosure.

Please refer to FIG. 6, which shows a schematic sectional view of a vibration and noise absorbing mat structure in accordance to a sixth exemplary embodiment of the present disclosure.

The vibration and noise absorbing mat structure comprises a mat body 600, which is a flexible multi-layered composite structure. The present exemplary embodiment is similar to that of the first exemplary embodiment described above. The main difference between the present exemplary embodiment and the first exemplary embodiment is that the vibration damping layer 2 further comprises another sub-layer 21 (second sub-layer). The sub-layer 21 is composed of a sixth foam body L6 having a relatively high hardness, a seventh foam body L7 having a relatively high elasticity and an eighth foam body L8 having a relatively high hardness stacked in sequence from top to bottom. The seventh foam body L7 is arranged between the sixth foam body L6 and eighth foam body L8 that are stacked to form another sandwich arrangement. Moreover, the sub-layer 20 is stacked on the sub-layer 21, so that the sub-layer 20 and the sub-layer 21 are arranged in a stack with respect to each other.

It should be noted that the vibration damping layer 2 in the present exemplary embodiment merely comprises the sub-layers 20 and 21. In another embodiment, the vibration damping layer 2 may comprise more sub-layers stack arranged one above the other according to the actual need.

[Seventh Exemplary Embodiment]

Figure 7:
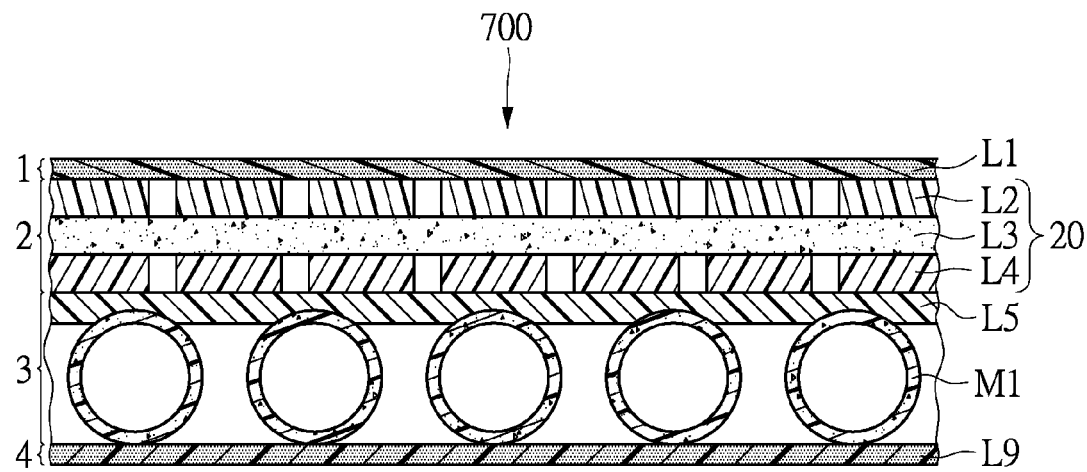
FIG. 7 shows a schematic sectional view of a vibration and noise absorbing mat structure in accordance to a seventh exemplary embodiment of the present disclosure.

Please refer to FIG. 7, which shows a schematic sectional view of a vibration and noise absorbing mat structure in accordance to a seventh exemplary embodiment of the present disclosure.

The vibration and noise absorbing mat structure comprises a mat body 700, which is a flexible multi-layered composite structure. The present exemplary embodiment is similar to that of the first exemplary embodiment described above. The main difference between the present exemplary embodiment and the first exemplary embodiment is that the mat body 700 further comprises another sound-absorbing layer 4 (second sound-absorbing layer). The sound-absorbing layer 4 is made of a ninth foam body L9 having a relatively low hardness. The ninth foam body L9 and the first foam body L1 may use the same material, so that the sound-absorbing layers 1 and 4 can cooperatively form a detachable sound-absorbing bag to envelop the vibration damping layer 2 and the buffer layer 3. In another embodiment, the 1 sound-absorbing layer 4 is simply located at the bottom side of the buffer layer 3 and composed of a sound-absorbing fiber cloth or a mesh cloth.

[Eighth Exemplary Embodiment]

Figure 8:
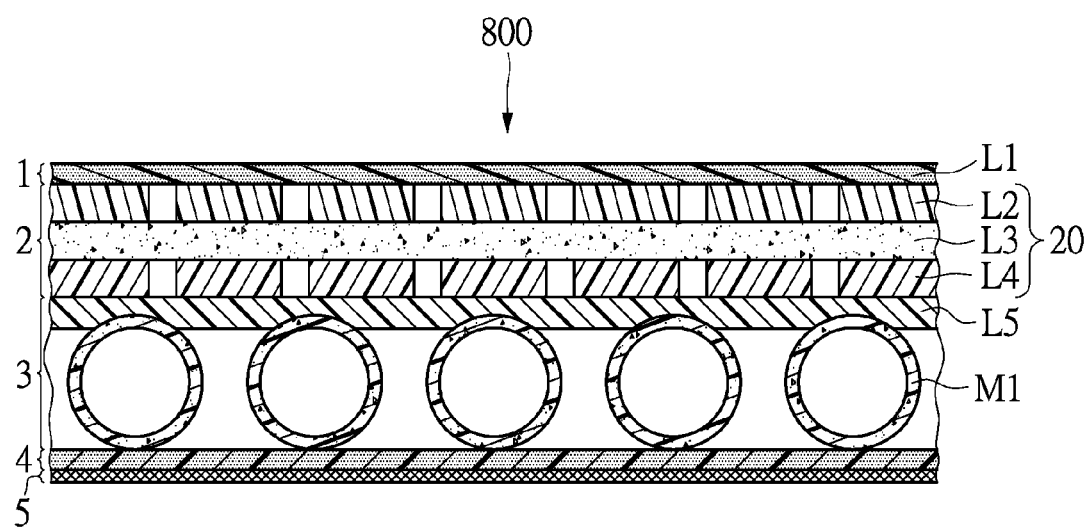
FIG. 8 shows a schematic sectional view of a vibration and noise absorbing mat structure in accordance to an eighth exemplary embodiment of the present disclosure.

Please refer to FIG. 8, which shows a schematic sectional view of a vibration and noise absorbing mat structure in accordance to an eighth exemplary embodiment of the present disclosure.

The vibration and noise absorbing mat structure comprises a mat body 800, which is a flexible multi-layered composite structure. The present exemplary embodiment is similar to that of the seventh exemplary embodiment described above. The main difference between the present exemplary embodiment and the seventh exemplary embodiment is that the mat body 800 further comprises a protective layer 5. The protective layer 5 is located at the bottom side of the sound-absorbing layer 4 and composed of a non-slipping rubber or foam material to improve the anti-slip effect of the entire mat body 800.

[Ninth Exemplary Embodiment]

Figure 9A:
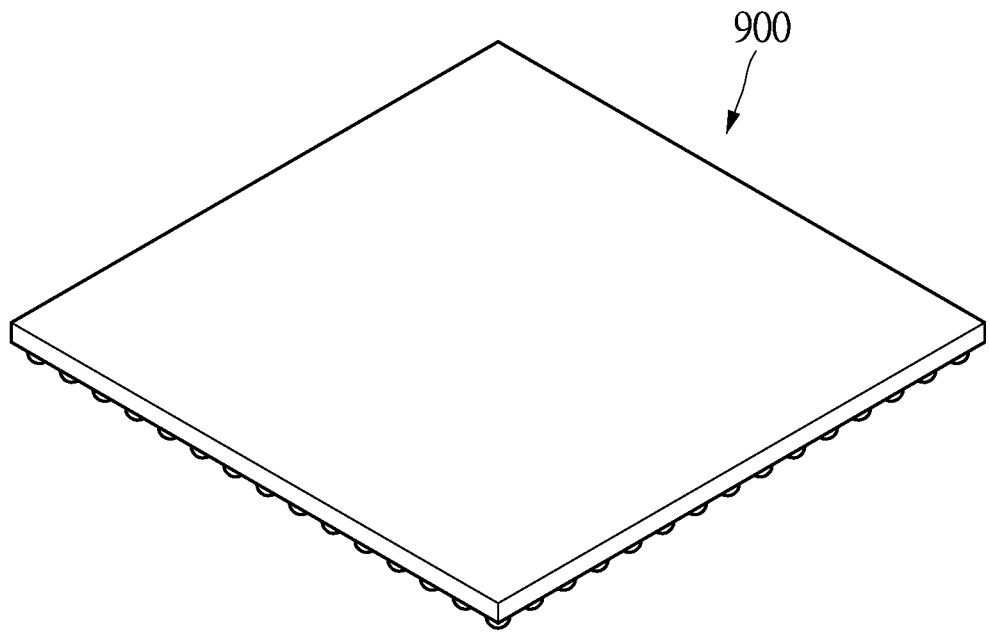
FIG. 9A shows a schematic representation of a vibration and noise absorbing mat structure in accordance to a ninth exemplary embodiment of the present disclosure.
Figure 9B:
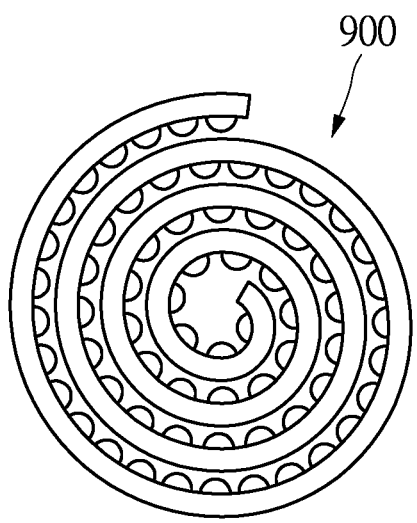
FIG. 9B shows a schematic representation of a vibration and noise absorbing mat structure in accordance to a ninth exemplary embodiment of the present disclosure in a rolled-up state.

Please refer to FIGS. 9A and 9B, which show a schematic representation of a vibration and noise absorbing mat structure in accordance to a ninth exemplary embodiment of the present disclosure.

The vibration and noise absorbing mat structure comprises a mat body 900, which is a flexible multi-layered composite structure. According to the exemplary illustration in FIG. 9A, the mat body 900 may form an integrated structure, and can be stored in a rolled-up state as shown in FIG. 9B, in order to reduce the space requirements.

[Tenth Exemplary Embodiment]

Figure 10A:
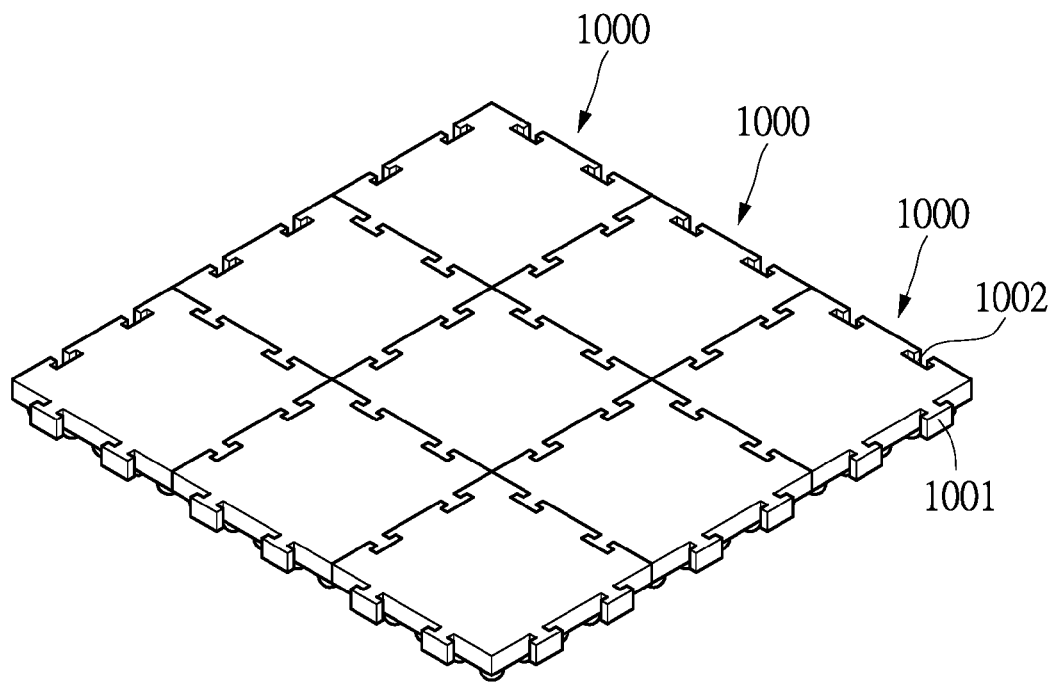
FIG. 10A shows a schematic representation of a vibration and noise absorbing mat structure in accordance to a tenth exemplary embodiment of the present disclosure.
Figure 10B:
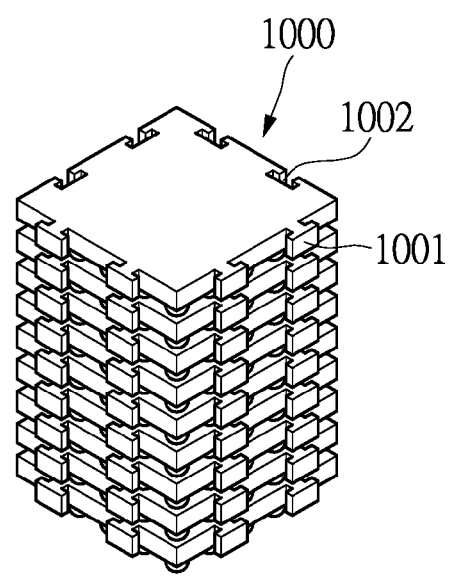
FIG. 10B shows a schematic representation of a vibration and noise absorbing mat structure in accordance to a tenth exemplary embodiment of the present disclosure in a stacked state.

Please refer to FIGS. 10A and 10B, which show a schematic representation of a vibration and noise absorbing mat structure in accordance to a tenth exemplary embodiment of the present disclosure.

The vibration and noise absorbing mat structure comprises a plurality of mat bodies 1000, each of which is a flexible multi-layered composite structure. By way of example, the mat bodies 1000 are detachably connected to each other, optionally even more mat bodies 1000 can be added to form a larger vibration and noise absorbing mat structure. In detail, each of the mat bodies 1000 includes a first connecting portion 1001 disposed on two side edges respectively and a second connecting portion 1002 disposed on another two side edges respectively. The first connecting portion 1001, for example, is a connecting protrusion, and the second connecting portion 1002, for example, is a connecting groove. According to the exemplary illustration in FIG. 10B, the mat bodies 1000 can be separated from each other and stored in a stacked state for minimizing space requirements.

In summary, the vibration and noise absorbing mat structure in accordance with the embodiments of the instant disclosure can provide a sound absorbing, vibration damping and buffering effect through the sound-absorbing layer, the vibration damping layer and the buffer layer arranged in a stacked arrangement. The sound-absorbing layer can reduce the noise generated by a foot striking against the outer surface of the mat body through the use of a soft foam material. The vibration damping layer is capable of simulating a floorboard in its hardness to avoid a too soft tread feeling, and can simultaneously reduce vibration and noise through the sandwich arrangement. The buffer layer is composed of a foam body of high hardness and the buffer units are disposed on the bottom side thereof so as to mitigate the impact force and reduce the impact sound. In addition, each of the buffer units is designed to be spherical or hemispherical in shape, so that the ground contact area can be reduced. Furthermore, the mat body may comprise an additional bottom sound-absorbing layer, which, with the top sound-absorbing layer, may cooperatively form a detachable bag, given a uniform appearance, and achieving a way of simple substitution in case of contamination or loss. In addition, the mat body may further comprise a protective layer composed of a non-slipping rubber or a foam material to improve the anti-slip effect of the entire mat body.

The descriptions illustrated supra set forth simply the preferred embodiments of the present invention; however, the characteristics of the present invention are by no means restricted thereto. All changes, alterations, or modifications conveniently considered by those skilled in the art are deemed to be encompassed within the scope of the present invention delineated by the following claims.

What is claimed is:

1. A vibration and noise absorbing mat structure, comprising:
   a flexible mat body comprising: a sound-absorbing layer, a vibration damping layer and a buffer layer stacked in order;
   wherein the sound-absorbing layer is made of a first foam body having a relatively low hardness;
   wherein the vibration damping layer comprises a sub-layer which is composed of a second foam body having a relatively high hardness, a third foam body having a relatively high elasticity and a fourth foam body having a relatively high hardness stacked in order;

wherein the buffer layer is composed of a fifth foam body and a plurality of buffer units spacedly disposed on a bottom side of the fifth foam body;

wherein the second foam body and the fourth foam body each has the hardness in a range of 60-90 Shore A Durometer hardness, greater than the hardness of the third foam body, and wherein the second foam body and the fourth foam body each has a plurality of through holes formed therein.

2. The vibration and noise absorbing mat structure according to claim 1, wherein the vibration damping layer further comprises another sub-layer, the another sub-layer and the sub-layer are arranged in a stack with respect to each other, the another sub-layer is composed of a sixth foam body having a relatively high hardness, a seventh foam body having a relatively high elasticity, and a eighth foam body having a relatively high hardness stacked in order.

3. The vibration and noise absorbing mat structure according to claim 2, wherein the flexible mat body further comprises another sound-absorbing layer which is made of a ninth foam body having a relatively low hardness, the another sound-absorbing layer and the sound-absorbing layer cooperatively form a sound-absorbing bag to envelop the vibration damping layer and the buffer layer.

4. The vibration and noise absorbing mat structure according to claim 2, wherein the flexible mat body further comprises another sound-absorbing layer located at a bottom side of the buffer layer, the another sound-absorbing layer is composed of a sound-absorbing fiber cloth or a mesh cloth.

5. The vibration and noise absorbing mat structure according to claim 3, wherein the flexible mat body further comprises a protective layer located at a bottom side of the another sound-absorbing layer, the protective layer is composed of a non-slipping rubber or a foam material.

6. The vibration and noise absorbing mat structure according to claim 1, wherein the third foam body is made of memory foam, latex foam, and combinations thereof.

7. The vibration and noise absorbing mat structure according to claim 1, wherein each of the buffer units is a convex structure and the buffer units cooperatively form a curved bottom surface of the flexible mat body.

8. The vibration and noise absorbing mat structure according to claim 7, wherein each of the buffer units is an airbag.

9. The vibration and noise absorbing mat structure according to claim 8, wherein the buffer units are communicated with each other via a channel.

10. The vibration and noise absorbing mat structure according to claim 9, wherein the buffer units are communicated with an air inlet channel.

11. The vibration and noise absorbing mat structure according to claim 7, wherein the buffer units are integrally formed on the bottom side of the fifth foam body.

12. The vibration and noise absorbing mat structure according to claim 7, wherein the buffer units are adhered to the bottom side of the fifth foam body.

13. The vibration and noise absorbing mat structure according to claim 12, wherein each of the buffer units is filled with a filler material.

14. The vibration and noise absorbing mat structure according to claim 13, wherein the filler material is sponge or silicone.

15. The vibration and noise absorbing mat structure according to claim 1, further comprising: another flexible mat body;

wherein the another flexible mat body and the flexible mat body are detachably connected to each other.

\* \* \* \* \*